US008418155B2

(12) United States Patent
McAllister et al.

(10) Patent No.: US 8,418,155 B2
(45) Date of Patent: Apr. 9, 2013

(54) GENERATING PARALLEL SIMD CODE FOR AN ARBITRARY TARGET ARCHITECTURE

(75) Inventors: Jeffrey S. McAllister, Saint Paul, MN (US); Nelson Ramirez, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1081 days.

(21) Appl. No.: 12/368,424

(22) Filed: Feb. 10, 2009

(65) Prior Publication Data
US 2010/0205580 A1 Aug. 12, 2010

(51) Int. Cl.
*G06F 9/06* (2006.01)
*G06F 9/44* (2006.01)
*G06F 9/45* (2006.01)
*G06F 9/00* (2006.01)

(52) U.S. Cl.
USPC ............ 717/149; 717/106; 717/151; 717/159

(58) Field of Classification Search .................... 717/106
See application file for complete search history.

(56) References Cited

U.S. PATENT DOCUMENTS

| | | | | | |
|---|---|---|---|---|---|
| 5,535,393 | A | * | 7/1996 | Reeve et al. | 717/149 |
| 5,774,728 | A | * | 6/1998 | Breslau et al. | 717/141 |
| 5,815,720 | A | * | 9/1998 | Buzbee | 717/158 |
| 6,253,371 | B1 | * | 6/2001 | Iwasawa et al. | 717/150 |
| 6,738,967 | B1 | * | 5/2004 | Radigan | 717/146 |
| 7,367,026 | B2 | * | 4/2008 | Eichenberger et al. | 717/160 |
| 7,386,842 | B2 | * | 6/2008 | Eichenberger et al. | 717/150 |
| 7,434,213 | B1 | * | 10/2008 | Prakash et al. | 717/152 |
| 7,475,392 | B2 | * | 1/2009 | Eichenberger et al. | 717/150 |
| 7,707,564 | B2 | * | 4/2010 | Marvin et al. | 717/140 |
| 7,966,602 | B1 | * | 6/2011 | Webster et al. | 717/114 |
| 2002/0184476 | A1 | * | 12/2002 | McKenney | 712/225 |
| 2004/0111701 | A1 | * | 6/2004 | Beust | 717/108 |
| 2006/0123401 | A1 | * | 6/2006 | O'Brien et al. | 717/131 |
| 2008/0034357 | A1 | * | 2/2008 | Gschwind | 717/149 |
| 2008/0229298 | A1 | * | 9/2008 | O'Brien et al. | 717/160 |

OTHER PUBLICATIONS

Kahn, G. and MacQueen, D. "Coroutines and Networks of Parallel Processes", Information Processing 77: Proceedings of IFIP Congress 77 (B. Gilchrist, Ed.), Aug. 1977, 983-998.*
Hensgen, Debra, Finkel, Raphael, and Manber, Udi "Two Algorithms for Barrier Synchronization", International Journal of Parallel Programming vol. 17, No. 1, 1-17.*
Hensgen, Debra, Finkel, Raphael, and Manber, Udi "Two Algorithms for Barrier Synchronization", International Journal of Parallel Programming vol. 17, No. 1, Jul. 1-17, 1988.*

* cited by examiner

*Primary Examiner* — Lewis A Bullock, Jr.
*Assistant Examiner* — Keith C Yuen
(74) *Attorney, Agent, or Firm* — Patterson & Sheridan LLP (57) ABSTRACT

Techniques are disclosed for automating the generation of parallel SIMD native source code in three major functional areas of data transmission, synchronization, and SIMD operations. An annotation standard is defined that is independent from native compilers and, coupled with a source-to-source compiler that provides high-level abstractions of data transmission, synchronization, and SIMD operations, relieves the need for programmers to work in a hardware-specific manner, while addressing issues of productivity and portability in a parallel SIMD computing environment.

13 Claims, 6 Drawing Sheets

FIG. 2

```
/* testAPCG.cpp
   sample APCG parallel application source file in C++ */

/* define target architectures */
/* command ( target name, connects from,
                     comm. protocol, target architecture ) */
//APCG  DEFINETARGET ( CHILD, PARENT, libspe2, CELLSPU )  ⎫
//APCG  DEFINETARGET ( PARENT, HOST, tcp, CELLPPU )       ⎬ 320
//APCG  DEFINETARGET ( HOST, none, none, x86 )            ⎭

/* define code blocks */
/* command ( target name, program name, max threads ) */
//APCG  BLOCK_START ( CHILD, test1, 6 )  ⎯⎯⎯ 340
/* define program 'test1.cpp' for target CHILD */
/* shared variable */
//APCG  SHARED_BUFFER ( A, vfloat4, 128 )  ⎯⎯⎯ 342
{
    int i;
    /* SIMD operation */
    vfloat4 A1 = simd_splat ( .5f );  ⎯⎯⎯ 344

/* data transfer */
    //APCG  GET ( A )  ⎯⎯⎯ 346
    for ( i=0; i<128; i++ )
    {
        /* SIMD operation */
        A [ i ] = simd_add ( A [ i ], A1 );  ⎯⎯⎯ 348
    }
    /* data transfer */
    //APCG  PUT ( A )  ⎯⎯⎯ 350
}
//APCG  BLOCK_END  ⎯⎯⎯ 352

//APCG  BLOCK_START ( PARENT, test2, 1 )        ⎫
/* define program 'test2.cpp' for target PARENT */ ⎬ 360
//APCG  BLOCK_END                                ⎭

//APCG  BLOCK_START ( HOST, test3, 1 )          ⎫
/* define program 'test3.cpp' for target HOST */ ⎬ 380
//APCG_BLOCK_END                                 ⎭
```

Target architecture definition example — 602

| //APCG DEFINETARGET ( PARENT, HOST, tcp, CELLPPU ) | Define target "PARENT" having Cell PPU architecture, connecting from "HOST" using the TCP protocol |
|---|---|

Code block definition examples — 604

| //APCG BLOCK_START ( CHILD, test1, 6 ) | Start code block "test" for CHILD, max 6 threads |
|---|---|
| //APCG BLOCK_END | End code block |

Shared variable definition example — 606

| //APCG SHARED_BUFFER ( A, vfloat4, 128 ) | Variable name, variable type, array size. Reserves buffers for up to "max" child threads |
|---|---|

Data transmission functionality examples — 608

| //APCG PUT ( A ) | Put A using the given communications protocol |
|---|---|
| //APCG GET ( A ) | Get A using the given communications protocol |
| //APCG SCATTER ( A ) | Efficiently put A to all threads using the given communications protocol |
| //APCG GATHER ( A ) | Efficiently get A from all threads using the given communications protocol |

Synchronization functionality examples — 610

| //APCG WAIT_FOR_MSG_FROM ( A ) | Wait until a message is received from A |
|---|---|
| //APCG WAIT_FOR_MSG_TO ( A ) | Wait until A receives a message |
| //APCG BARRIER | Wait until all peers have reached this barrier in their execution |

SIMD functionality examples — 612

| C = simd_add1 ( A, B ) | C=A+B, where all are single vector variables |
|---|---|
| C = simd_sub1 ( A, B ) | C=A-B, where all are single vector variables |
| C = simd_mul1 ( A, B ) | C=A*B, where all are single vector variables |
| D = simd_madd1 ( A, B, C ) | D=A*B+C, where all are single vector variables |
| B = simd_sqrt1 ( A ) | B=sqrt(A), where all are single vector variables |
| B = simd_splat1 ( A ) | B=splat(A), where all are single vector variables |

| C = simd_add ( A, B ) | C=A+B, where all are arrays of vector variables (implied loop) |
|---|---|
| C = simd_sub ( A, B ) | C=A-B, where all are arrays of vector variables (implied loop) |
| C = simd_mul ( A, B ) | C=A*B, where all are arrays of vector variables (implied loop) |
| D = simd_madd ( A, B, C ) | D=A*B+C, where all are arrays of vector variables (implied loop) |
| B = simd_sqrt ( A ) | B=sqrt(A), where all are arrays of vector variables (implied loop) |
| B = simd_splat ( A ) | B=splat(A), where all are arrays of vector variables (implied loop) |

FIG. 6

GENERATING PARALLEL SIMD CODE FOR AN ARBITRARY TARGET ARCHITECTURE

FIELD OF THE INVENTION

Embodiments of the invention generally relate to compilers. More specifically, embodiments of the invention relate to techniques for automating the generation of parallel SIMD native source code for an arbitrary target architecture.

DESCRIPTION OF THE RELATED ART

Many modern processors support single instruction, multiple data (SIMD) extensions. SIMD indicates a single instruction that operates on a number of data items in parallel. For example, an "add" SIMD instruction may add eight 16 bit values in parallel. These instructions increase execution speed dramatically by accomplishing multiple operations within one instruction. Examples of SIMD instructions include multimedia extension ("MMX") instructions, SSE instructions, and vectored multimedia extension ("VMX") instructions.

While computer hardware has supported multiple forms of parallelism for many years, it is well-recognized that programmers are not always able to use these performance features very productively. This may result from lack of standardization and difficulty in converting non-parallel algorithms to a parallel architecture due to lack of sufficient software abstractions within the programming languages to handle new computing architectures. It is typical for a vendor to implement its own vision of parallel programming with unique abstractions and naming schemes. The inability of programmers to use these performance features very productively may also result from a lack of support in computer programming languages, as many popular languages were developed before parallelism was widely available (e.g., C, C++) and focus on utilizing a single thread of execution in a single machine. New languages face acceptance difficulties. Without a wide user base, a new language (even if designed specifically for portable parallel performance productivity) can easily be less portable, perform more slowly, and impede programmer productivity more than hardware-specific approaches.

SUMMARY OF INVENTION

One embodiment of the invention includes a method for generating source code for a parallel computing architecture. The method may generally include receiving annotated source code annotated according to a predefined annotation standard. The predefined annotation standard may be used to specify (i) a target architecture for a parallel application program and (ii) one or more parallel application operations for the parallel application program to perform when executed on the target architecture. The parallel application operations may be selected from at least data transmission operations, synchronization operations, and single-instructions multiple data (SIMD) operations. The method may also include parsing the annotated source code to identify the target architecture for the parallel application program and the one or more parallel application operations and generating one or more tokens, where each token describes one of the one or more parallel application operations. The method may further include generating, from the one or more tokens, parallel application source code configured to perform the one or more parallel application operations on the target architecture.

Still another embodiment of the invention includes a computer-readable storage medium containing a program which, when executed, performs an operation for generating parallel SIMD source code for a target architecture. The operation may generally include receiving annotated source code annotated according to a predefined annotation standard. The predefined annotation standard may be used to specify (i) a target architecture for a parallel application program and (ii) one or more parallel application operations for the parallel application program to perform when executed on the target architecture. The parallel application operations may be selected from at least data transmission operations, synchronization operations, and single-instructions multiple data (SIMD) operations. The operation may also include parsing the annotated source code to identify the target architecture for the parallel application program and the one or more parallel application operations and generating one or more tokens, where each token describes one of the one or more parallel application operations. The operation may further include generating, from the one or more tokens, parallel application source code configured to perform the one or more parallel application operations on the target architecture.

Still another embodiment of the invention includes a system having a processor and a memory containing a source-to-source compiler application, which when executed by the processor is configured to generate source code for a target architecture. The compiler application may be generally configured to receive annotated source code annotated according to a predefined annotation standard. The predefined annotation standard may be used to specify (i) a target architecture for a parallel application program and (ii) one or more parallel application operations for the parallel application program to perform when executed on the target architecture. The parallel application operations may be selected from at least data transmission operations, synchronization operations, and single-instructions multiple data (SIMD) operations. The complier application may be further configured to parse the annotated source code to identify the target architecture for the parallel application program and the one or more parallel application operations and generating one or more tokens, where each token describes one of the one or more parallel application operations. The complier application may be further configured to generate, from the one or more tokens, parallel application source code configured to perform the one or more parallel application operations on the target architecture

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6 is a table illustrating an example annotation standard for generating parallel SIMD source code for a target architecture, according to one embodiment of the invention.

DETAILED DESCRIPTION OF THE PREFERRED EMBODIMENTS

Embodiments of the invention provide techniques for automatically generating parallel SIMD native source code. In one embodiment, a source-to-source compiler may be configured to generate machine-specific code for data transmission, synchronization, and SIMD operations performed by a parallel application program compiled for various parallel architectures. Further, the source-to-source compiler described herein addresses productivity and portability concerns. Instead of working in a hardware-specific manner, programmers specify data transmission, synchronization, and SIMD operations for a parallel application using an annotation standard. Doing so allows the developer to specify both a particular parallel architecture and the operations to perform on that architecture. This allows the programmer to focus on the particular application logic of an application rather than the particular mechanics of a specific parallel architecture. Further, code portability is dramatically increased as, once the application is developed, the annotations may be modified to generate source code for any particular parallel architecture capable of being described by the annotation standard.

In one embodiment, the source-to-source compiler receives source code annotated using a predefined annotation standard. The annotation standard is independent from a set native compilers used by different nodes of a parallel computing system (e.g., one compiler for an x86 processor and another for a Cell BE processor). The annotation standard allows the developer to specify what transmission, synchronization, and SIMD operations to perform as part of the parallel application, and the source-to-source compiler generates the appropriate source code for a particular target architecture. The annotation standard may support a variety of different grammars, target architecture definitions, code block definitions, shared variable definitions, data transmission functionality, synchronization functionality, and SIMD functionality. Although the C++ programming language is used as an example herein, one of ordinary skill in the art will recognize that embodiments described herein may be adapted for use with a variety of programming languages. For instance, embodiments described herein may be adapted for use with interpreted languages, in which dynamic code generation and just-in-time compilation may take place.

Further still, standardization issues are also addressed by making the annotated source code independent from native compilers. Native compilers ignore the annotations as comments and treat the annotated source code as a serial program. The source-to-source compiler generates code which may then be compiled natively as a parallel application for a particular target architecture.

Furthermore, by generating source code for different architectures using the source-to-source compiler, consistency is maintained between the source code for different architectures. For example, array sizes, types, and alignments often need to agree exactly in code generated for two, three, or more parallel system compilers. As an example, for the Cell processor, a power processing unit (PPU) and a synergistic processing unit (SPU) often work with the same data, even though PPU code is compiled with PPU compilers and SPU code is compiled with SPU compilers. Maintaining this consistency is a source of error as well as a loss of programmer productivity.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
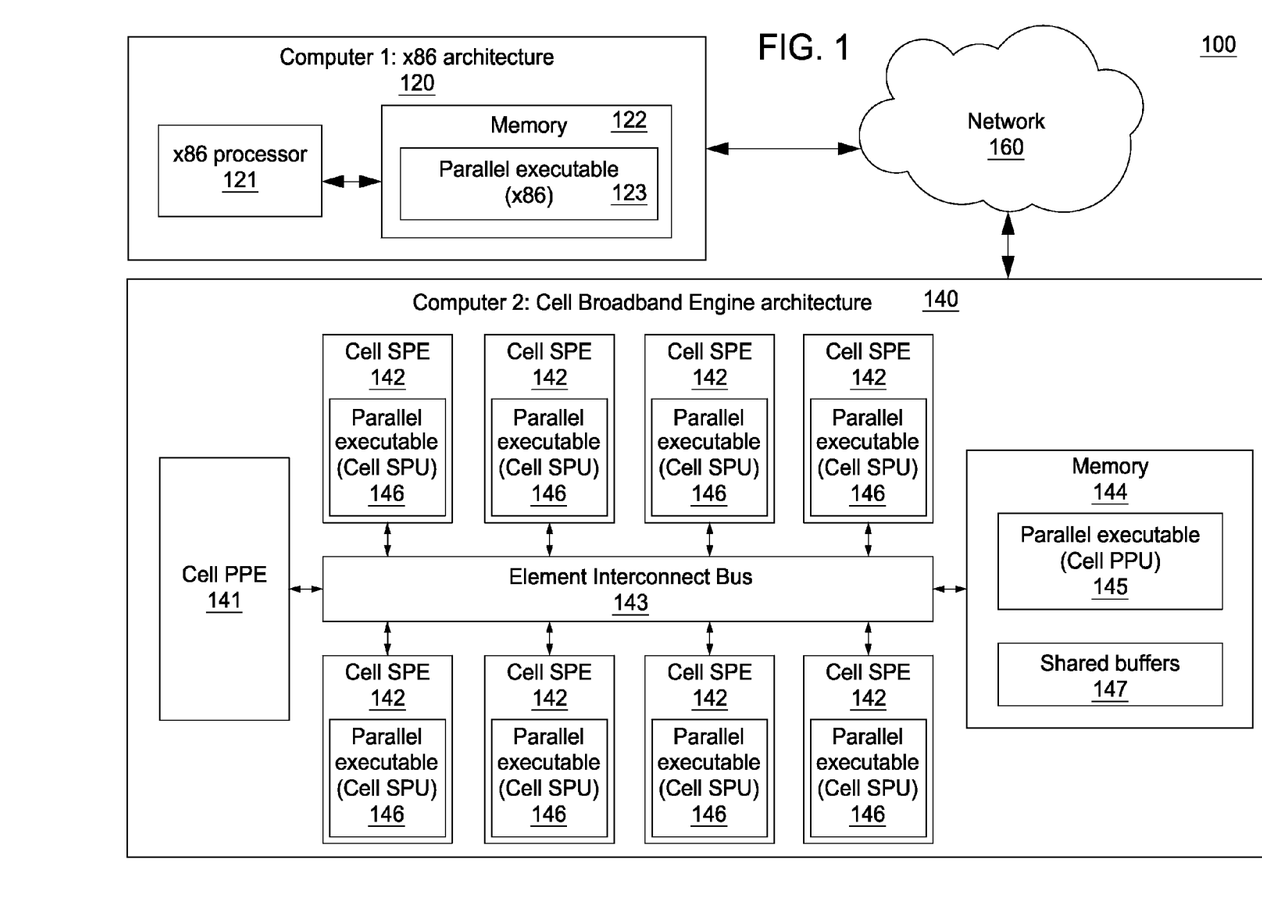
FIG. 1 is a block diagram that illustrates a parallel application executing in a heterogeneous parallel computing environment, according to one embodiment of the invention.

FIG. 1 is a block diagram that illustrates a parallel application 123, 145, 146 executing in a heterogeneous parallel computing environment 100, according to one embodiment of the invention. As shown, heterogeneous parallel computing environment 100 includes computers 120, 140 and a network 160. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, each computer 120, 140 includes a processor 121, 141, 142, which obtains instructions and data from a memory 122, 144 and any storage devices (e.g., a hard-drive, flash memory, or a computer readable storage medium such as a CD or DVD-ROM). Each processor 121, 141, 142 is a programmable logic device that performs all the instruction, logic, and mathematical processing in a computer. Each storage stores application programs and data for use by the respective computers 120, 140. The storage includes harddisk drives, flash memory devices, optical media and the like. The computers 120, 140 are operably connected to the network 160. Memory 122, 144 includes a parallel executable 123, 145, 146, shared buffers 147, and an operating system (not shown). An operating system is the software used for managing the operation of computers 120, 140. Examples of operating systems include UNIX, a version of the Microsoft Windows® operating system, and distributions of the Linux® operating system. (Note: Linux is a trademark of Linus Torvalds in the United States and other countries.)

In one embodiment, a heterogeneous parallel application executes in the form of parallel executables 123, 145, 146 on a heterogeneous target architecture. In the example shown in FIG. 1, the heterogeneous target architecture includes two computer systems 120, 140 communicating over network 160 to execute parallel task 123, 145, 146. Specifically in this example, an x86 computer 120 features the x86 target architecture, while a Cell Broadband Engine (BE) computer 141 features the Cell power processor unit (PPU) and Cell synergistic processor unit (SPU) target architectures.

In this example, a Cell BE computer 141 includes a power processor element (PPE) having a processor (PPU) and its L1 and L2 caches. The Cell BE computer 141 also includes multiple synergistic processor elements (SPEs) that each provide a synergistic processor unit (SPU) and local store as well as a high bandwidth internal element interconnect bus (EIB). Other target architectures not shown in the example are broadly contemplated.

Illustratively, the x86 processor 121 executes the x86 parallel executable 123 and communicates via a network 160 with a Cell PPU 141 executing the Cell PPU executable 145. The Cell PPU 141 and the Cell SPUs 142 use shared buffers 147 and execute, respectively, the Cell PPU parallel executable 145 and the Cell SPU parallel executable 146, communicating via an Element Interconnect Bus 143.

Figure 2:
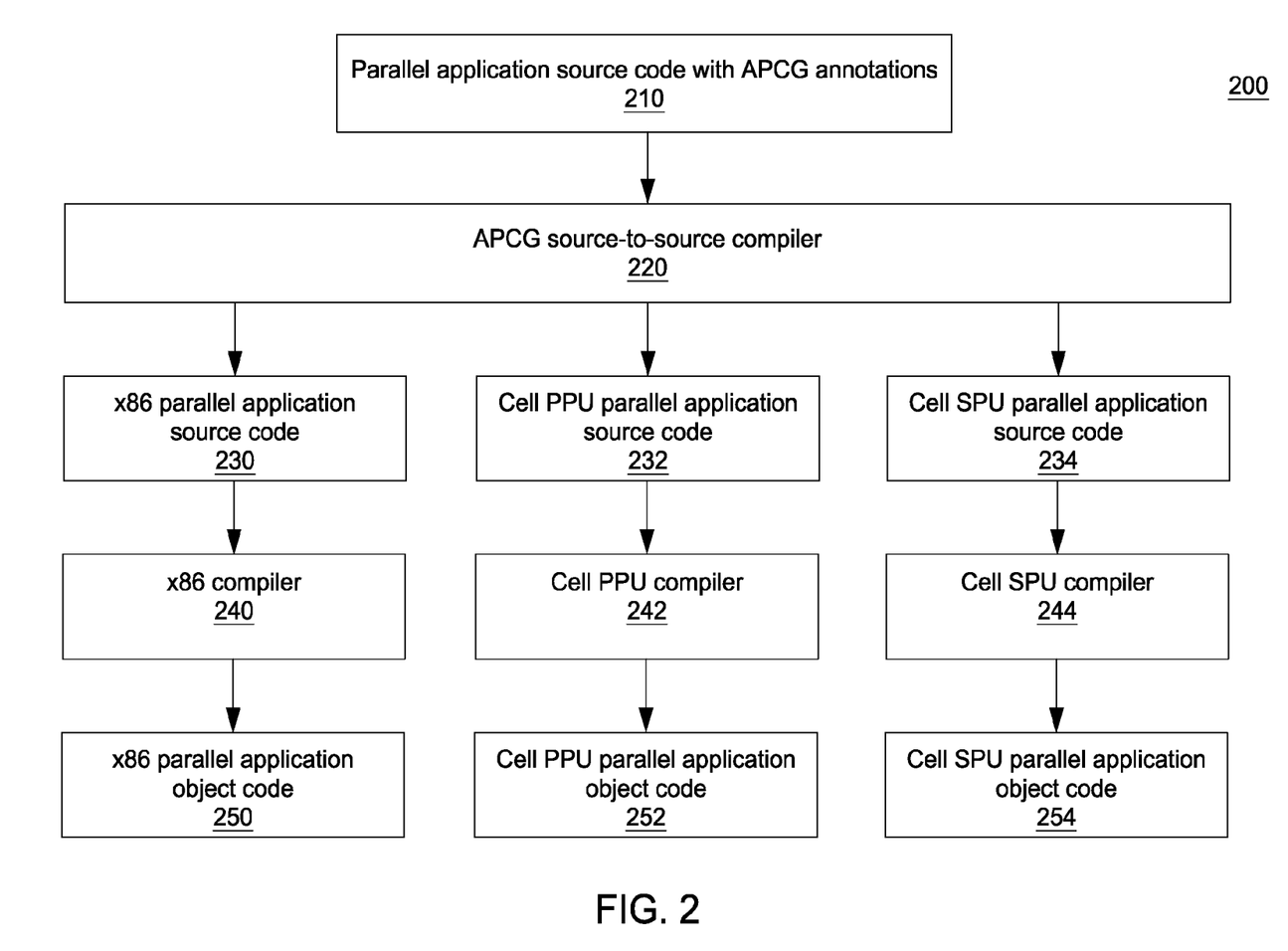
FIG. 2 is a block diagram that illustrates how annotated parallel application source code may be compiled into object code for respective target architectures, according to one embodiment of the invention.

FIG. 2 is a block diagram that illustrates a data flow for annotated parallel application source code 210 to be compiled into object code for a given target architecture, according to one embodiment of the invention. Illustratively, an Automatic Parallel Code Generation (APCG) source-to-source compiler 220 receives the annotated parallel application source code 210. In one embodiment, the annotated parallel application source code 210 is annotated using a predefined annotation standard. Using the predefined annotation standard, a user can specify a desired environment for which source code is generated. That is, the annotation standard allows the developer to describe a hierarchy for a given target architecture. For example, a system may include a x86 processor supported by a number of accelerator processors (as children) (e.g., collection of vector processors) and organized as a parent child hierarchy.

The APCG source-to-source compiler 220 may evaluate annotations in the annotated parallel application source code 210 (according to the predefined annotation standard) and generate native parallel application source code for the target architecture described the annotations. In the example shown in FIG. 2, the target architectures are x86, Cell PPU, and Cell SPU. Of course, a variety of target architectures not shown in this example are broadly contemplated. Furthermore, appropriate best-practice native code is generated by the APCG source-to-source compiler. The resulting parallel application source code 230, 232, 234 can be further developed by a programmer or compiled immediately with native compilers. As shown, the native parallel application source code 230, 232, 234 are received by respective native compilers 240, 242, 244, which generate the respective object code 250, 252, 254 for the respective target architectures.

Figure 3:
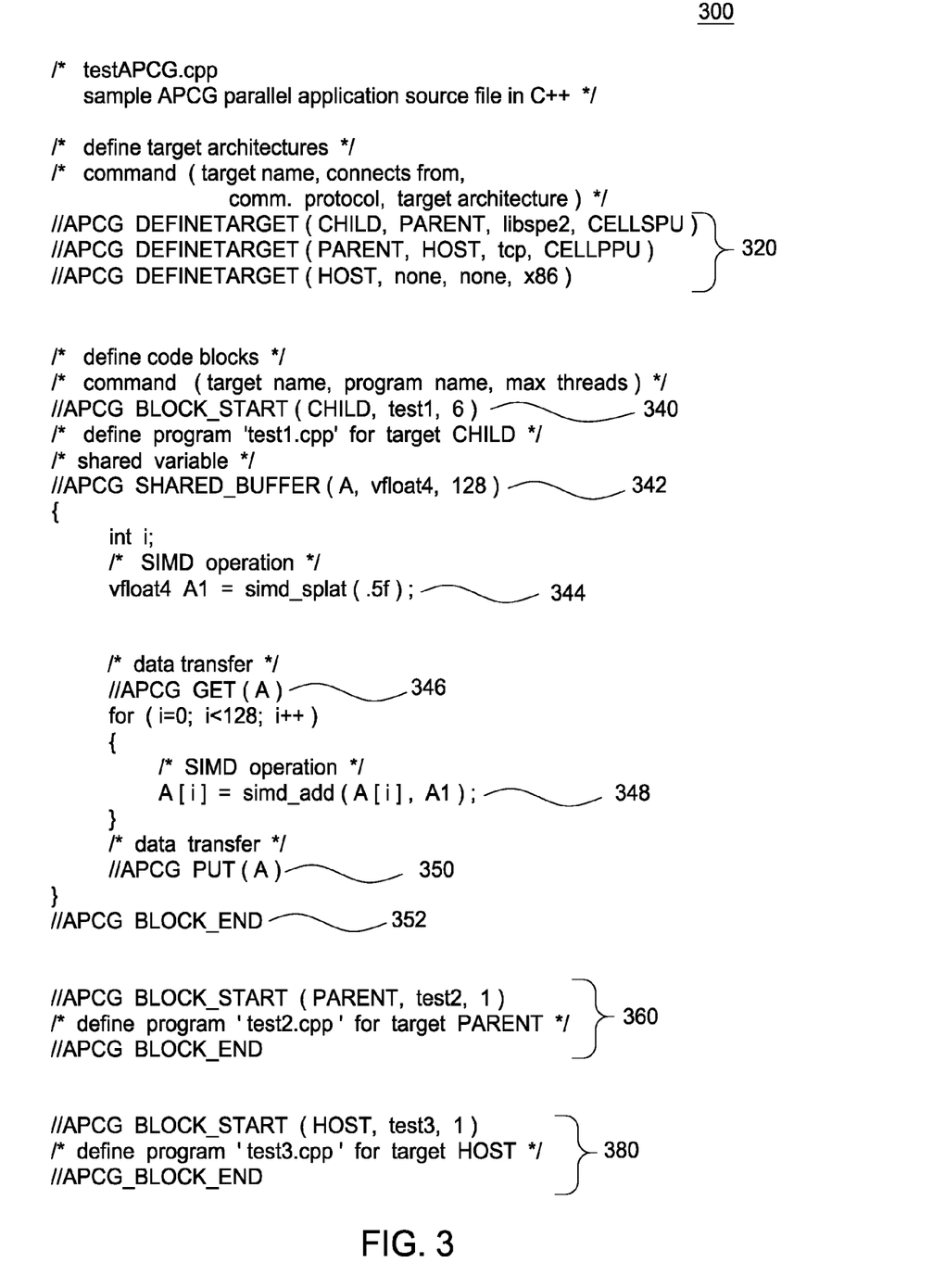
FIG. 3 illustrates an example annotated parallel application source file, according to one embodiment of the invention.

FIG. 3 illustrates an example of an annotated parallel application source file 300, according to one embodiment of the invention. Illustratively, annotations are presented in a C++ conventional single-line comment notation of "//APCG" (double slash). Explanatory comments are presented in a C++ conventional long comment notation of "/* . . . */" (slash asterisk) to distinguish explanatory comments from annotations. Annotations 320 are used to define a target architecture for which the source-to-source compiler generates source code. In this example, each definition specifies a name, a parent name, a communications protocol, and a target architecture type. Illustratively, the three defined architectures include a target Cell SPU architecture "CHILD", that connects from "PARENT" using the libspe2 communications protocol; a target Cell PPU architecture, PARENT, that connects from "HOST" using the TCP protocol; and a target x86 architecture, HOST. Annotations 340, 352, 360, 380 are used to demarcate code blocks. Each block provides a contiguous region of code targeted toward an architecture for the respective block. For example, at 340, a block is named "test" and is targeted toward CHILD, allowing a maximum of six threads of execution. Similarly, annotation 360 defines a program "test2" for PARENT, allowing a maximum of one thread of execution, and annotation 380 defines a program "test3" for HOST, also allowing a maximum of one thread of execution. The source-to-source compiler uses the annotations 320, 340 to generate three separate source code files (containing code blocks), one for each of specified target architectures.

An annotation 342 is used to define shared variables. The source-to-source compiler uses shared variable definitions to generate corresponding definitions native to a specified target architecture. In this example, each definition specifies a variable name, a variable type, and an array size. For example, the annotation 342 declares a shared variable "A" of type "vfloat4" having an array size of 128. PARENT reserves an area of memory according to the specified size (array size of 128 in this example) for each CHILD thread (a maximum of six CHILD threads in this example). SIMD operation annotations 344 and 348 perform SIMD operations, such as a vector splat operation (i.e., copy a value to all elements of a vector register) and vector addition. Data transfer annotations 346, 350 PUT and GET the vector variable A using the libspe2 protocol specified in annotations 320.

Figure 4:
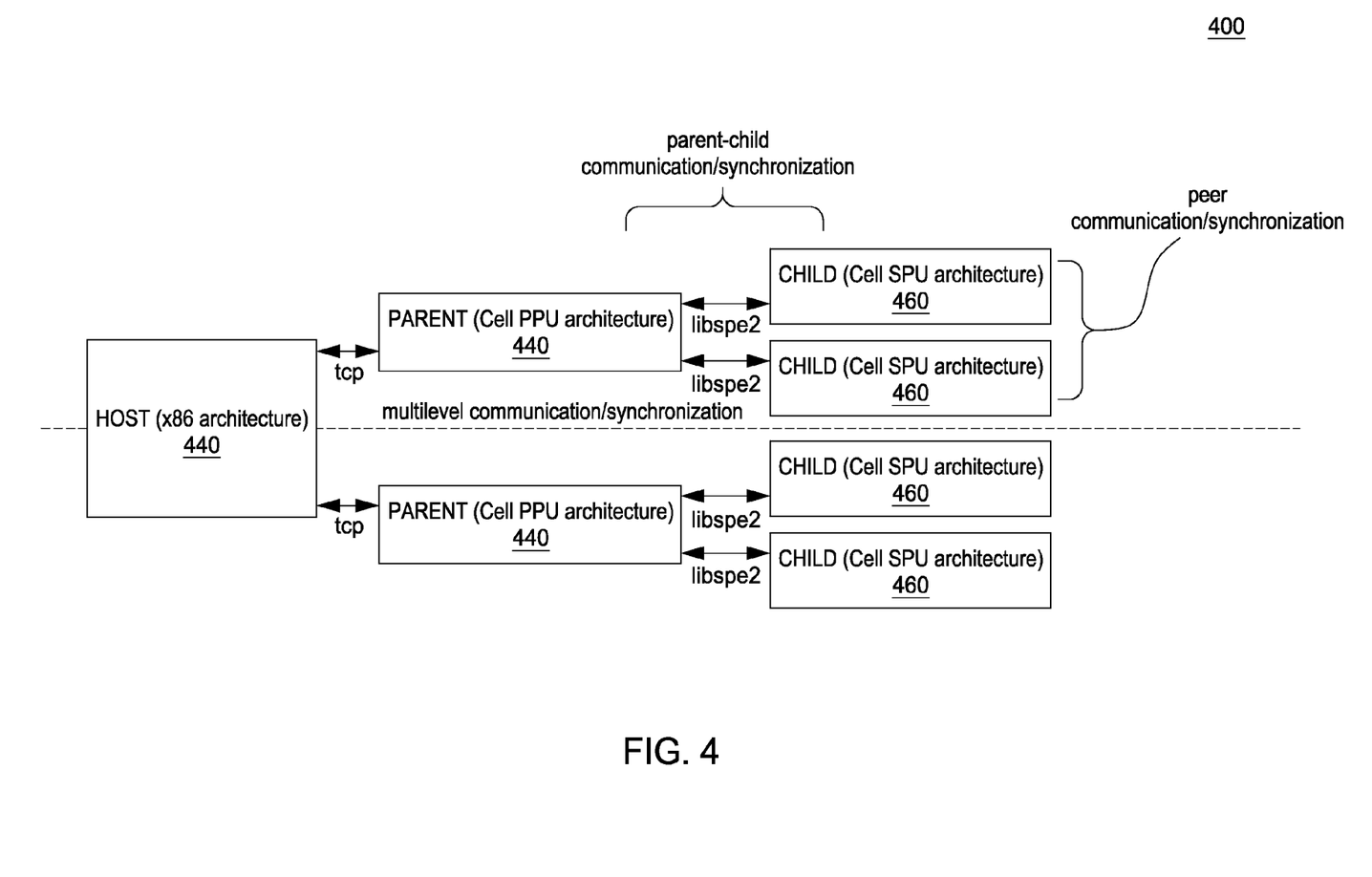
FIG. 4 is a block diagram that illustrates parent-child communication and synchronization and peer communication and synchronization in a heterogeneous parallel computing environment, according to one embodiment of the invention.

The source-to-source compiler also generates synchronization code native to a specified target architecture. FIG. 4 is a block diagram that illustrates parent-child communication and synchronization and peer communication and synchronization in a heterogeneous parallel computing environment, according to one embodiment of the invention. In this example, target architecture definition annotations define an x86-Cell-PPU-Cell-SPU, "HOST-PARENT-CHILD" target architecture. HOST 420 communicates with PARENT 440 using TCP 430, and PARENT 440 communicates with CHILD 460 using lipspe2 450. Peer communications and synchronization occur among CHILD threads; parent-child communications and synchronization occur between PARENT and CHILD; and multilevel communications and synchronization occur among PARENTs. Source code for communications and synchronization is generated by the source-to-source compiler using annotations for communications and synchronization, respectively.

Figure 5:
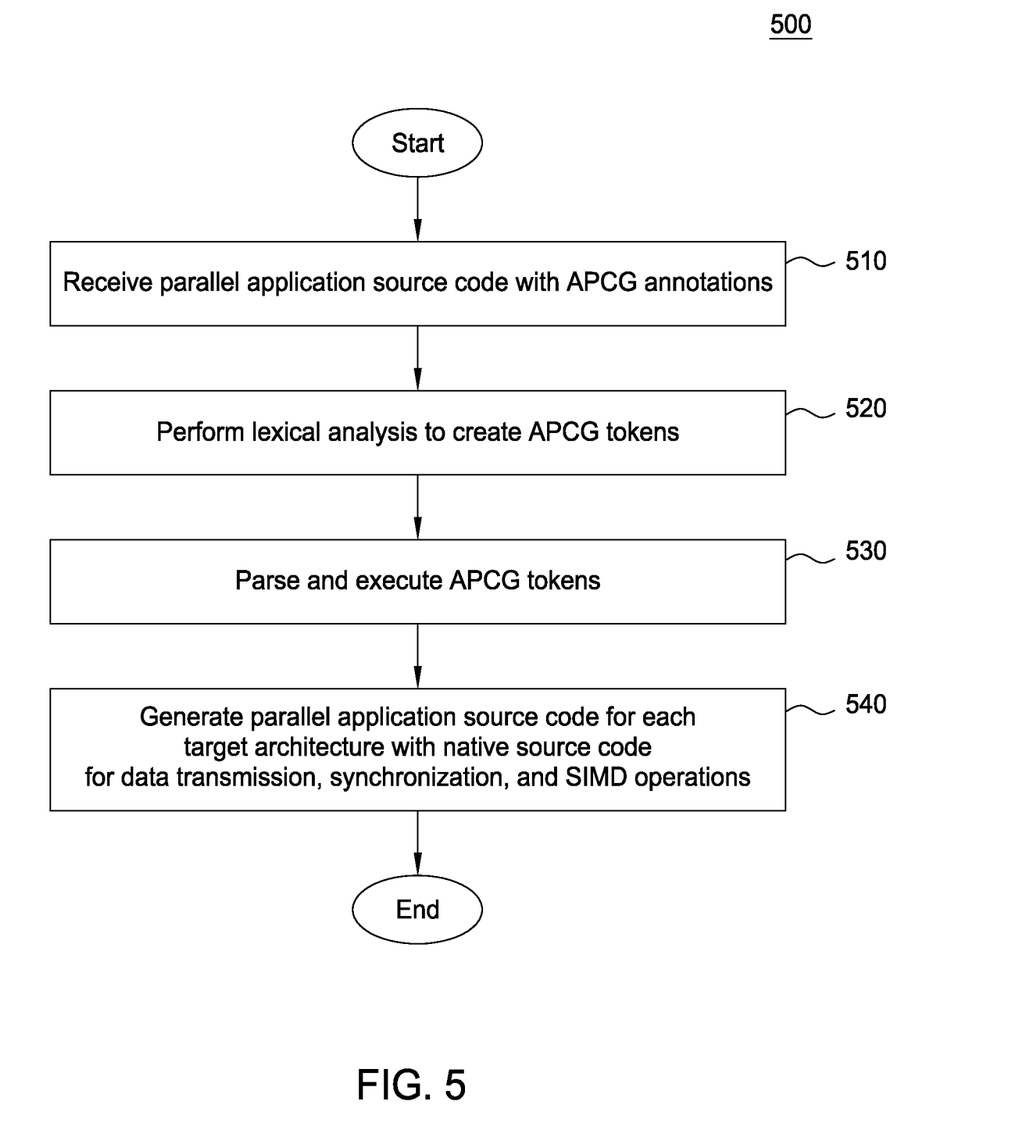
FIG. 5 is a flow diagram illustrating a method for generating parallel SIMD source code for a target architecture, according to one embodiment of the invention.

FIG. 5 is a flow diagram illustrating a method 500 for generating parallel SIMD source code for a target architecture, according to one embodiment of the invention. For the sake of illustration, method 500 is described in conjunction with the system of FIG. 2. However, persons skilled in the art will understand that any system configured to perform the steps of the method 500, in any order, is within the scope of the present invention.

As shown, the method 500 begins at step 510, where a source-to-source compiler receives parallel SIMD source code annotated according to a predefined annotation standard. At step 520, the source-to-source compiler evaluates the parallel SIMD source code to create a plurality of annotation tokens. A token generally refers to the smallest lexical unit in a programming language. In one embodiment, the source-to-source compiler converts annotations to a set of tokens representing the programmatic structure for source code corresponding to the actions specified in the annotations. Further, the tokens may be generated based on the target architecture specified by the annotations. At step 530, the source-to-source compiler parses the plurality of annotation and determines the appropriate source code needed to perform the action specified by a given token, e.g., setting up internal representation of variables to be transferred or dividing a main source file into functional blocks, or other data transmission, synchronization, and SIMD operations for the target architecture specified by the APCG annotations, according to one embodiment.

At step 540, the source-to-source compiler generates native parallel SIMD source code for a target architecture. For example, the source-to-source compiler may create multiple source files as output, with data transmission, synchronization, and SIMD operations composed in a format for the target architectures specified by the APCG annotations. Illustratively, given an annotation token and a target architecture, the source-to-source compiler may use mapping tables to determine corresponding native syntax and data types for executing the annotation in the target architecture. The source-to-source compiler uses annotation tokens and mapping table lookups to generate native source code for data transmission, synchronization, and SIMD operations. After step 540, method 500 terminates.

As described above, the source-to-source compiler receives source code annotated using a predefined annotation standard. FIG. 6 is a table illustrating an example annotation standard for generating parallel SIMD source code for a target architecture, according to one embodiment of the invention. As described above, the annotation standard allows users to specify target architectures for which source code is generated. Further, the annotation standard allows users to specify data transmission functionality, synchronization functionality, and SIMD functionality in a compiler-independent manner. Further still, the annotation standard allows the source-to-source compiler to generate native code to perform data transmission, synchronization, and SIMD operations for a variety of different target architectures. Illustratively, at block 604, FIG. 6 shows a definition for a target "PARENT" having Cell PPU architecture, connecting from "HOST" using TCP as the communications protocol. An example of code block definition 604 defines the start and the end of a code block "test" for CHILD, allowing a maximum number of six threads. A shared variable definition 606 reserves a vfloat4 array of size 128 for each CHILD thread, for up to six CHILD threads.

A data transmission functionality block 608 includes examples of PUT, GET, SCATTER, and GATHER operations. Generally, a SCATTER operation is equivalent to a "PUT to all threads" operation, but with improved performance. Similarly, a GATHER operation is equivalent to a "GET from all threads," operation, but with improved performance. It is contemplated that the PUT, GET, SCATTER, and GATHER operations may additionally allow the communication protocol to be specified, in one embodiment of the invention (e.g., "//APCG PUT(A, protocol_name)"). In addition, data transmission and synchronization are intertwined. Sometimes, data transmission is combined with synchronization (blocking communication), while other times, synchronization is performed separately. The synchronization functionality block 610 provides examples of a WAIT operation which sends a message and waits until all peers have reached this BARRIER in their execution. Finally, the SIMD functionality block 612 provides examples of SIMD (e.g., vector) operations for add, subtract, multiply, multiply and add, compute the square root, and splat single vector variables and arrays of vector variables via an implied loop. It is contemplated that SIMD operations for arrays of vector variables may entail an implied loop over all (or some) of the data elements in the vector variables, in one embodiment of the invention. Further, a user may specify "simd_add(A, B, pattern_array)" where pattern_array is a pattern array that indicates which elements of the arrays are to be processed. All of the aforementioned operations are expressed in generic form in the predefined annotation standard. In one embodiment, the source-to-source compiler translates these operations into appropriate native syntax and data types in the output source code.

Advantageously, embodiments of the invention provide a source-to-source compiler configured to generate machine-specific code for data transmission, synchronization, and SIMD operations. In one embodiment, the source-to-source compiler receives source code annotated using a predefined annotation standard. The annotation standard is independent from native compilers and supports target architecture definitions, code block definitions, shared variable definitions, data transmission functionality, synchronization functionality, and SIMD functionality. Of course, the embodiments described herein are intended to be illustrative and not limiting of the invention, and other embodiments are broadly contemplated. Those skilled in the art will recognize, for example, that other programming languages, such as C and Java, may be supported by embodiments of the invention. Furthermore, with regard to the predefined annotation standard, other syntax, grammars, and operations in the areas of data transmission, synchronization, and SIMD operations, are broadly contemplated. Finally, any heterogeneous parallel architecture may be supported by embodiments of the invention.

While the foregoing is directed to embodiments of the present invention, other and further embodiments of the invention may be devised without departing from the basic scope thereof, and the scope thereof is determined by the claims that follow.

What is claimed is:

1. A computer-implemented method to programmatically generate parallel application source code for each of a plurality of distinct parallel computing architectures, based on source code user-annotated according to a predefined annotation standard that is independent of each parallel computing architecture, the method comprising:

receiving source code of a parallel application program, wherein the source code is annotated based on user input and according to the predefined annotation standard specifying a grammar for expressing: (i) a target architecture definition comprising at least two of a target name, an architecture type, a parent name, and a communications protocol; (ii) a code block definition comprising a target name, a code block name, and a maximum number of threads to execute; and (iii) a shared variable definition comprising a variable name, a variable type, and an array size;

identifying, based on the received source code and the predefined annotation standard: (i) a plurality of target architectures for the parallel application program and (ii) one or more parallel application operations for the parallel application program to perform when executed on each target architecture, wherein each target architecture comprises a distinct parallel computing architecture, wherein the predefined annotation standard is independent of each target architecture, wherein the one or more parallel application operations are selected from at least data transmission operations, synchronization operations, and single-instruction multiple data (SIMD) operations;

generating, for each of the identified target architectures and by operation of one or more computer processors, parallel application source code that is native to the respective identified target architecture, based on the identified one or more parallel application operations and a predefined set of mappings between: (i) the identified one or more parallel application operations and (ii) corresponding syntax native to the respective identified target architecture, wherein the generated parallel application source code is output.

2. The method of claim 1, wherein the plurality of identified target architectures specifies a hierarchy of processing elements that includes at least one general purpose processing element and one special purpose processing element configured to support the general purpose processing element.

3. The method of claim 2, further comprising, via one or more native compilers available for a first of the identified target architectures, compiling the parallel application source code generated for the first target architecture, to create the parallel application program for the first target architecture.

4. The method of claim 3, wherein the parallel application operation includes one of a data transmission operation and a synchronization operation, wherein the data transmission operation specifies one of a put operation and a get operation, and wherein the synchronization operation specifies one of a wait operation and a barrier operation.

5. The method of claim 4, wherein the parallel application operation comprises a SIMD operation selected from at least one of an add, a subtract, a multiply, a splat, and a square root operations for single vector variables;

wherein each target architecture is specified based on a predefined syntax specific to the predefined annotation standard and not specific to any of the target architectures;

wherein each of the one or more parallel application operations is specified based on the predefined syntax;

wherein the predefined set of mappings further specifies a corresponding data type native to the respective identified target architecture;

wherein at least one annotation in the received source code is ignored by a respective, native compiler for each of the distinct parallel computing architectures;

wherein the one or more parallel application operations include at least one data transmission operation, at least one synchronization operation, and at least one SIMD operation, wherein the predefined set of mappings is stored in a mapping table;

wherein the plurality of distinct parallel computing architectures includes a host architecture, a parent architecture, and a child architecture organized according to a predefined communication hierarchy, wherein the host architecture is disposed at a first level of the predefined communication hierarchy, wherein the parent architecture is disposed at a second level of the predefined communication hierarchy lower than the first level, wherein the child architecture is disposed at a third level of the predefined communication hierarchy lower than the second level;

wherein the predefined communication hierarchy is configured such that direct communication occurs only between adjacent levels of the predefined communication hierarchy and not between non-adjacent levels of the predefined communication hierarchy and such that direct communication optionally occurs between a program instance at a given level of the predefined communication hierarchy and multiple program instances at a level of the predefined communication hierarchy adjacent to and lower than the given level;

wherein the host architecture comprises an x86 architecture, wherein the parent architecture comprises a Cell Broadband Engine (BE) synergistic processor unit (SPU) architecture, wherein the child architecture comprises a Cell BE power processor unit (PPU) architecture.

6. A non-transitory computer-readable medium containing a program which, when executed, performs an operation to programmatically generate parallel application source code for each of a plurality of distinct parallel computing architectures, based on source code user-annotated according to a predefined annotation standard that is independent of each parallel computing architecture, the operation comprising:

receiving source code of a parallel application program, wherein the source code is annotated based on user input and according to the predefined annotation standard specifying a grammar for expressing: (i) a target architecture definition comprising at least two of a target name, an architecture type, a parent name, and a communications protocol; (ii) a code block definition comprising a target name, a code block name, and a maximum number of threads to execute; and (iii) a shared variable definition comprising a variable name, a variable type, and an array size;

identifying, based on the received source code and the predefined annotation standard: (i) a plurality of target architectures for the parallel application program and (ii) one or more parallel application operations for the parallel application program to perform when executed on each target architecture, wherein each target architecture comprises a distinct parallel computing architecture, wherein the predefined annotation standard is independent of each target architecture, wherein the one or more parallel application operations are selected from at least data transmission operations, synchronization operations, and single-instruction multiple data (SIMD) operations;

generating, for each of the identified target architectures and by operation of one or more computer processors when executing the program, parallel application source code that is native to the respective identified target architecture, based on the identified one or more parallel application operations and a predefined set of mappings between: (i) the identified one or more parallel application operations and (ii) corresponding syntax native to the respective identified target architecture, wherein the generated parallel application source code is output.

7. The non-transitory computer-readable medium of claim 6, wherein the operation further comprises, via one or more native compilers available for a first of the identified target architectures, compiling the parallel application source code generated for the first target architecture, to create the parallel application program for the first target architecture.

8. The non-transitory computer-readable medium of claim 7, wherein the parallel application operation includes one of a data transmission operation and a synchronization operation, wherein the data transmission operation specifies one of a put operation and a get operation, and wherein the synchronization operation specifies one of a wait operation and a barrier operation.

9. The non-transitory computer-readable medium of claim 8, wherein the parallel application operation comprises a SIMD operation selected from at least one of an add, a subtract, a multiply, a splat, and a square root operations for single vector variables;

wherein each target architecture is specified based on a predefined syntax specific to the predefined annotation standard and not specific to any of the target architectures;

wherein each of the one or more parallel application operations is specified based on the predefined syntax;

wherein the predefined set of mappings further specifies a corresponding data type native to the respective identified target architecture;

wherein at least one annotation in the received source code is ignored by a respective, native compiler for each of the distinct parallel computing architectures; wherein the one or more parallel application operations include at least one data transmission operation, at least one synchronization operation, and at least one SIMD operation, wherein the predefined set of mappings is stored in a mapping table;

wherein the plurality of distinct parallel computing architectures includes a host architecture, a parent architecture, and a child architecture organized according to a predefined communication hierarchy, wherein the host architecture is disposed at a first level of the predefined communication hierarchy, wherein the parent architecture is disposed at a second level of the predefined communication hierarchy lower than the first level, wherein the child architecture is disposed at a third level of the predefined communication hierarchy lower than the second level;

wherein the predefined communication hierarchy is configured such that direct communication occurs only between adjacent levels of the predefined communication hierarchy and not between non-adjacent levels of the predefined communication hierarchy and such that direct communication optionally occurs between a program instance at a given level of the predefined communication hierarchy and multiple program instances at a level of the predefined communication hierarchy adjacent to and lower than the given level;

wherein the host architecture comprises an x86 architecture, wherein the parent architecture comprises a Cell Broadband Engine (BE) synergistic processor unit (SPU) architecture, wherein the child architecture comprises a Cell BE power processor unit (PPU) architecture.

10. A system to programmatically generate parallel application source code for each of a plurality of distinct parallel computing architectures, based on source code user-annotated according to a predefined annotation standard that is independent of each parallel computing architecture, the system comprising:

a processor; and a memory containing a source-to-source compiler application, which when executed by the processor is configured to generate source code for a target architecture by performing the steps of:

receiving source code of a parallel application program, wherein the source code is annotated based on user input and according to the predefined annotation standard specifying a grammar for expressing: (i) a target architecture definition comprising at least two of a target name, an architecture type, a parent name, and a communications protocol; (ii) a code block definition comprising a target name, a code block name, and a maximum number of threads to execute; and (iii) a shared variable definition comprising a variable name, a variable type, and an array size;

identifying, based on the received source code and the predefined annotation standard: (i) a plurality of target architectures for the parallel application program and (ii) one or more parallel application operations for the parallel application program to perform when executed on each target architecture, wherein each target architecture comprises a distinct parallel computing architecture, wherein the predefined annotation standard is independent of each target architecture, wherein the one or more parallel application operations are selected from at least data transmission operations, synchronization operations, and single-instruction multiple data (SIMD) operations;

generating, for each of the identified target architectures, parallel application source code that is native to the respective identified target architecture, based on the identified one or more parallel application operations and a predefined set of mappings between: (i) the identified one or more parallel application operations and (ii) corresponding syntax native to the respective identified target architecture, wherein the generated parallel application source code is output.

11. The system of claim 10, wherein the operation further comprises, via one or more native compilers available for a first of the identified target architectures, compiling the parallel application source code generated for the first target architecture, to create the parallel application program for the first target architecture.

12. The system of claim 11, wherein the parallel application operation includes one of a data transmission operation and a synchronization operation, wherein the data transmission operation specifies one of a put operation and a get operation, and wherein the synchronization operation specifies one of a wait operation and a barrier operation.

13. The system of claim 12, wherein the parallel application operation comprises a SIMD operation selected from at least one of an add, a subtract, a multiply, a splat, and a square root operations for single vector variables;
wherein each target architecture is specified based on a predefined syntax specific to the predefined annotation standard and not specific to any of the target architectures;
wherein each of the one or more parallel application operations is specified based on the predefined syntax;
wherein the predefined set of mappings further specifies a corresponding data type native to the respective identified target architecture;
wherein at least one annotation in the received source code is ignored by a respective, native compiler for each of the distinct parallel computing architectures;
wherein the one or more parallel application operations include at least one data transmission operation, at least one synchronization operation, and at least one SIMD operation, wherein the predefined set of mappings is stored in a mapping table;
wherein the plurality of distinct parallel computing architectures includes a host architecture, a parent architecture, and a child architecture organized according to a predefined communication hierarchy, wherein the host architecture is disposed at a first level of the predefined communication hierarchy, wherein the parent architecture is disposed at a second level of the predefined communication hierarchy lower than the first level, wherein the child architecture is disposed at a third level of the predefined communication hierarchy lower than the second level;
wherein the predefined communication hierarchy is configured such that direct communication occurs only between adjacent levels of the predefined communication hierarchy and not between non-adjacent levels of the predefined communication hierarchy and such that direct communication optionally occurs between a program instance at a given level of the predefined communication hierarchy and multiple program instances at a level of the predefined communication hierarchy adjacent to and lower than the given level;
wherein the host architecture comprises an x86 architecture, wherein the parent architecture comprises a Cell Broadband Engine (BE) synergistic processor unit (SPU) architecture, wherein the child architecture comprises a Cell BE power processor unit (PPU) architecture.

* * * * *